United States Patent
Bolin et al.

(10) Patent No.: US 7,727,029 B2
(45) Date of Patent: Jun. 1, 2010

(54) CONNECTOR ARRANGEMENT HAVING MULTIPLE INDEPENDENT CONNECTORS

(75) Inventors: Thomas Bolin, Lund (SE); John Berntsen, Eslov (SE); Markus Palmgren, Landskrona (SE); Ingemar Thulin, Sodra Sandby (SE); Peter Sendelius, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 12/128,646

(22) Filed: May 29, 2008

(65) Prior Publication Data

US 2009/0286427 A1    Nov. 19, 2009

Related U.S. Application Data

(60) Provisional application No. 61/053,678, filed on May 16, 2008.

(51) Int. Cl.
*H01R 24/04* (2006.01)
(52) U.S. Cl. ............... 439/669; 439/668; 439/660
(58) Field of Classification Search ........... 439/669, 439/668, 660, 675
See application file for complete search history.

(56) References Cited

U.S. PATENT DOCUMENTS

| | | | |
|---|---|---|---|
| 3,308,415 A | 3/1967 | Cramer et al. | 439/103 |
| 4,420,216 A * | 12/1983 | Motoyama et al. | 439/188 |
| 4,869,566 A | 9/1989 | Juso et al. | 385/53 |
| 6,109,797 A | 8/2000 | Nagura et al. | 385/88 |
| 6,126,465 A | 10/2000 | Franks, Jr. | 439/218 |
| 6,461,199 B1 | 10/2002 | Koga et al. | 439/668 |
| 6,634,896 B1 | 10/2003 | Potega | 439/218 |
| 6,869,316 B2 * | 3/2005 | Hinkle et al. | 439/675 |
| 6,981,895 B2 * | 1/2006 | Potega | 439/578 |
| 7,458,853 B2 * | 12/2008 | Omura et al. | 439/607 |
| 7,537,489 B2 * | 5/2009 | Iranpour Feridani et al. | 439/660 |
| 2007/0077818 A1* | 4/2007 | Iwakawa | 439/610 |

FOREIGN PATENT DOCUMENTS

| | | |
|---|---|---|
| GB | 2 412 504 A | 9/2005 |
| WO | WO 2009/050544 A | 4/2009 |
| WO | WO 2009056913 A | 5/2009 |

OTHER PUBLICATIONS

A copy of the International Search Report issued in corresponding international application No. PCT/EP2008/009593, mailed Jul. 9, 2009.

* cited by examiner

*Primary Examiner*—Hae Moon Hyeon
(74) *Attorney, Agent, or Firm*—Harrity & Harrity, LLP

(57) ABSTRACT

A connector arrangement comprising an elongate member with electrically conducting areas forming a first connector and a second connector being arranged inside said elongate member ? The second connector is usable independently of the first connector.

18 Claims, 2 Drawing Sheets

US 7,727,029 B2

CONNECTOR ARRANGEMENT HAVING MULTIPLE INDEPENDENT CONNECTORS

CROSS-REFERENCE TO RELATED APPLICATIONS

This application claims priority under 35 U.S.C. §119 based on U.S. provisional application No. 61/053,678, filed May 16, 2008, the disclosure of which is incorporated by reference herein in its entirety.

FIELD OF THE INVENTION

The present invention relates to connector arrangements.

BACKGROUND OF THE INVENTION

Connectors and connector arrangement are commonly used to electrically connect two devices with each other. One type of connectors are audio connectors which are for example used to connect headphones or loudspeakers to audio equipment, for example portable or non-portable audio equipment, cell phones, personal computers, and the like. Commonly used audio connectors include 6.35 mm, 3.5 mm or 2.5 mm audio connectors. The male form of such audio connectors usually comprise a generally elongate member with different areas of the circumferential surface being electrically insulated from each other to provide a plurality of contacts. Conventional arrangements of such contacts are referred to as TS (Tip Sleeve), TRS (Tip Ring Sleeve) or TRRS (Tip Ring Ring Sleeve) connectors, indicated that a tip contact is insulated from a sleeve contact which is generally adjacent to the head, with no, one or two so-called ring contacts in between. For example, a TS connector may be used for mono audio, a TRS connector may be used for stereo audio and a TRRS connector may be used for stereo audio with an additional signal, for example a video signal.

Corresponding female connectors to the above-described male audio connectors may have an elongate hole with contact elements arranged therein corresponding to the positions of the insulated areas mentioned above.

These audio connectors have a basically standardized shape, such that for example headphones manufactured by one manufacturer may be used with portable audio equipment like a MP3 player from another manufacturer.

Besides female audio connectors, many audio devices have further connectors for further purposes, for example an antenna connector, a power connector, a data connector and the like. Such a plurality of connectors sometimes makes it difficult for a user to use the device since each device, cable or the like has to be plugged into the right connector. In case a device like loudspeakers or headphones are provided with additional functions, such a device may have more than one connector, for example to receive audio signals and power from the audio device, which makes connecting the device with the audio device somewhat inconvenient.

Therefore, there is a general need for improved connector arrangements offering more flexibility.

SUMMARY

In an embodiment, a connector arrangement is provided, comprising:

an elongate member, said elongate member comprising at least two electrically conducting areas on its outer surface, said at least two electrically conducting areas being insulated from each other and forming a first connector, and a second connector being arranged inside said elongate member and being accessible from an end face of said elongate member, said second connector being configured to be usable independently of said first connector.

Said first connector in an embodiment may be an audio connector.

The audio connector may be a 2.5 mm audio connector or a 3.5 mm audio connector.

The audio connector may be a tip sleeve (TS) connector, a tip ring sleeve (TRS) connector or a tip ring ring sleeve (TRRS) connector.

The second connector in an embodiment may comprise an elongate hole opening to said end face. One or more contact elements may be arranged at a sidewall of said elongate hole. Said at least one contact element may be configured as a contacting area in said sidewall.

In another embodiment, said second connector may comprise a first contact element surrounded by a second contact element.

Said first contact element may be chosen from the group comprising a contact pin and a contact channel, and said second contact element may be chosen from the group comprising a sleeve and a cylindrical member.

In an embodiment, said second connector may comprise an optical connector.

According to another embodiment, a connector arrangement is provided, comprising:

an elongate hole, at least two contact elements arranged at the side surface of said elongate hole and forming a first connector, a second connector being arranged essentially coaxial with said elongate hole, said second connector being usable independently of said first connector.

The elongate hole with the first connector may be configured to receive an audio connector like a 2.5 mm audio connector or a 3.5 mm audio connector, and may be arranged to receive audio connectors in tip sleeve, tip ring sleeve or tip ring ring sleeve configuration.

Said second connector may for example comprise an elongate member protruding into said elongate hole.

In an embodiment, said elongate member may be retractable from said elongate hole.

The connector arrangement may further comprise a resilient member coupled with said elongate member to bias said elongate member to protrude into said elongate hole.

In a different embodiment, said second connector may comprise a first contact element and a second contact element surrounding said first contact element.

In another embodiment, said second connector may comprise an optical connector.

It is to be noted that the above-mentioned embodiments and features may be combined with each other unless specifically noted to the contrary.

DETAILED DESCRIPTION OF THE INVENTION

Figure 1:
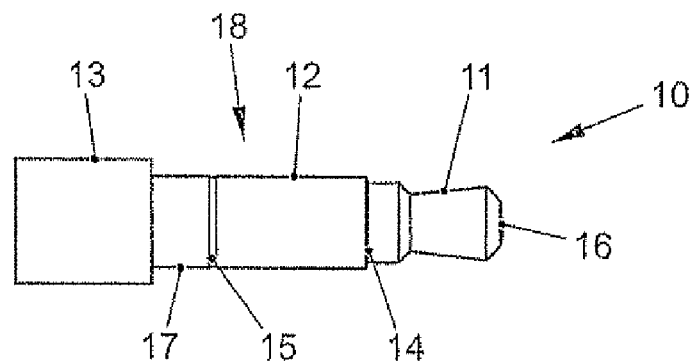
FIG. 1 is a side view of a connector arrangement according to an embodiment.

In the following, various embodiments of the present invention will be described in detail with reference to the accompanying drawings. It is to be understood that the following description and the drawings are given only for the purpose of illustration and are not to be taken in a limiting sense.

It is to be understood that in the drawings various elements are depicted in a manner to give a clear understanding of the respective embodiment to a person skilled in the art and are not necessarily drawn to scale. Moreover, any directional terminology like "left", "right", "top", "bottom", "up" or "down" is merely used to indicate certain elements in the drawings and is not to be construed as indicating any preferential orientation of the actual embodiments of connector arrangements described hereinafter, since these may be orientated in any desired direction.

The scope of the invention is not intended to be limited by the embodiments described hereinafter, but is intended to be limited only by the appended claims and equivalents thereof.

Figure 2:
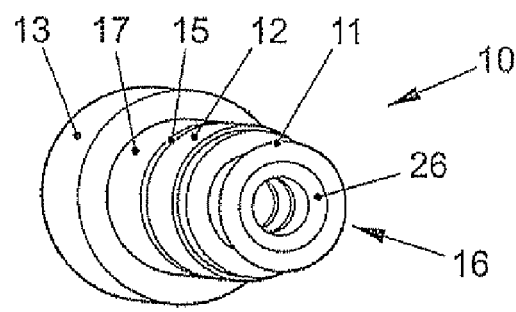
FIG. 2 is a perspective view of the connector arrangement of FIG. 1.
Figure 3:
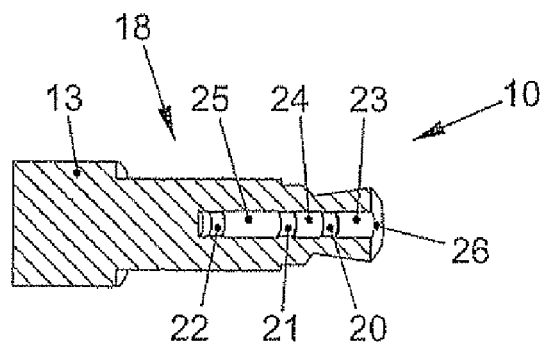
FIG. 3 is a perspective cut-out view of the connector arrangement of FIG. 1.

In FIGS. 1-3, a connector arrangement 10 according to an embodiment of the present invention is shown. FIG. 1 shows a side view of the connector arrangement, FIG. 2 shows a perspective view of the connector arrangement and FIG. 3 shows a cut-out view of the connector arrangement.

As can be best seen in FIGS. 1 and 2, the connector arrangement 10 has the general shape of a standard audio connector, for example a 2.5 mm audio connector or a 3.5 mm audio connector. The connector arrangement 10 comprises a head 13 and an elongate member generally designated 18. The elongate member 18 of this embodiment has three conducting areas on its outer surface, namely a tip portion 11, a ring portion 12 and a sleeve portion 17, which are electrically insulated from each other by insulating ring portions 14, 15. Such an arrangement of conducting areas serving as contacts is also referred to as a TRS-connector (Tip Ring Sleeve) and may be used for stereo audio signals, wherein for example sleeve portion 17 is used as ground contact, and tip portion 11 and ring portion 12 are used as contacts for a left channel and right channel, respectively. However, other uses of the conducting areas are equally possible. The connector arrangement 10 will also be referred to as a male connector arrangement hereinafter.

The male connector arrangement 10 of FIGS. 1, 2 and 3 may serve as a standard audio connector, i.e. be used with any device having a standard audio female connector for receiving connector arrangement 10.

Connector arrangement 10 of the embodiment of FIGS. 1, 2, 3 comprises an elongate hole within elongate member 18 extending from an opening 16 at an end face of tip portion 11. The elongate hole itself may best be seen in FIG. 3. The elongate hole is electrically insulated from the outside of elongate member 18, in particular tip portion 11, by an insulation 26. Inside the elongate hole, in the embodiment of FIG. 3 conducting contact areas 23, 24 and 25 are provided which are insulated by insulating rings 20, 21 and 22. Contact areas 23, 24 and 25 serve as a second connector besides a first connector formed by the conducting areas on the outside of elongate member 18, i.e. tip portion 11, ring portion 12 and sleeve portion 17. The first connector and the second connector may be used independently from each other. For example, as mentioned above the first connector may be used to transmit audio signals, while the second connector may be used to transmit data, DC power, identification data or any other kind of desired signal.

It should be noted while in FIG. 3 the second connector is provided with three contact areas 23, 24 and 25, any desired number of contact areas may be made available, for example a single contact area, two contact areas or more than three contact areas.

The connector arrangement 10 of the embodiment of FIGS. 1-3 as mentioned has the general shape of a male audio connector and may be used for example to establish audio connection with a standard female audio connector. Furthermore, with reference to FIG. 4 an embodiment of a corresponding female connector arrangement 30 will be discussed which enables contacting both the first connector on the outside of elongate member 18 and the second connector inside elongate member 18.

Female connector arrangement 30 comprises an elongate hole 41 configured to accommodate an elongate member of a male connector like elongate member 18 of connector arrangement 10 of FIGS. 1-3. Elongate hole 41 may for example be incorporated in a portable audio device, a cell phone and the like.

Figure 4:
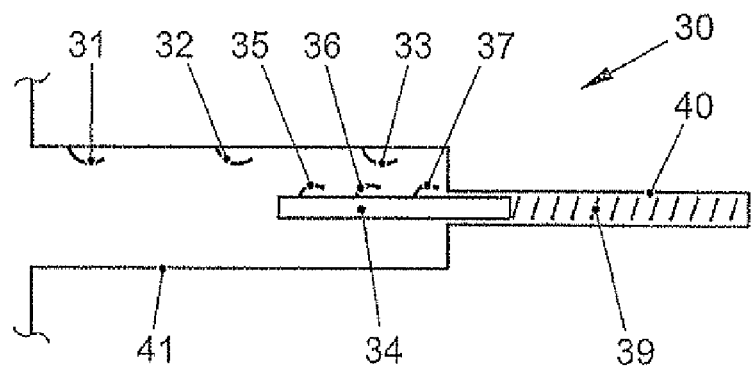
FIG. 4 is a cross-sectional view of a connector arrangement according to another embodiment of the present invention.

In elongate hole 41 at a sidewall thereof, in connector arrangement 30 of FIG. 4 three contacts 31, 32 and 33 are provided. Contacts 31, 32 and 33 each may comprise resilient conducting member having some resiliency to securely establish electrical contact with conducting areas like portions 11, 12 and 17 of elongate member 18 of FIGS. 1-3 of a corresponding male connector. Contacts 31, 32 and 33 may then be connected via wires (not shown) with further elements of a device where connector arrangement 30 is incorporated. Contacts 31, 32 and 33 form a first connector of connector arrangement 30.

Furthermore, connector arrangement 30 of the embodiment of FIG. 4 comprises an elongate member 34 which is arranged substantially at a central axis of, i.e. coaxially with, elongate hole 41. Elongate member 34 which may have a cylindrical or rod shape is provided with contacts 35, 36 and 37 on an outside thereof to contact corresponding contact areas like contact portions 23, 24 and 25 of male connector arrangement 10. Contacts 35, 36 and 37 form a second connector of connector arrangement 30. It should be noted that while contacts 31, 32 and 33 are arranged on the same side of elongate hole 41 and contacts 35, 36 and 37 are arranged on the same side of elongate member 34, these contacts may also be distributed circumferentially around the elongate hole and/or elongate member 34.

In the connector arrangement 30 of FIG. 4, elongate member 34 may be retracted into a channel 40. A spring 39 is provided to bias elongate member 34 to the position shown in FIG. 4, i.e. to protrude into the interior of elongate hole 41. In case a connector arrangement like male connector arrangement 10 is inserted into connector arrangement 30, as mentioned contacts 31, 32 and 33 establish contact with portions 17, 12 and 11, respectively, and contacts 35, 36 and 37 establish contact with portions 25, 24 and 23, respectively. In case a conventional male audio connector is inserted into connector arrangement 30, which conventional audio connector does not have an elongate hole within an elongate member like connector arrangement 10, elongate member 34 is pushed into channel 40 against the biasing force of spring 39. Therefore, also a conventional male audio connector may be used with female connector arrangement 30.

In another embodiment, elongate member 34 of female connector arrangement 40 may be non-movable. In such a case, only correspondingly adapted connector arrangements like connector arrangement 10 of FIGS. 1-3 may be inserted in female connector arrangement 30.

As already mentioned, in connector arrangement 10, the number of contact areas 25, 24 and 23 of the second connector may vary. Correspondingly, also the number of contacts 35, 36 and 37 may vary. Furthermore, while the audio connector is shown as a TRS connector having a tip contact portion, a ring contact portion and a sleeve contact portion, also a TS-type audio connector having only a tip contact portion and a sleeve contact portion, a TRRS-type connector having two ring contact portions insulated from each other or any other connector with an elongate member having a desired number of contact portions may be used. Correspondingly, also the number of contacts 31, 32 and 33 and their arrangement may vary in order to match a corresponding male connector arrangement.

In the male connector arrangement according to the embodiment of FIGS. 1-3, the second connector is formed by an elongate hole having contact portions, and correspondingly in the female connector arrangement 30 of the embodiment of FIG. 4 the second connector is formed by an elongate member 34 having contacts 35, 36 and 37 at an outside thereof. However, in other embodiments other configurations of second connectors are possible, some of which will be discussed below with reference to FIGS. 5 and 6.

Figure 5:
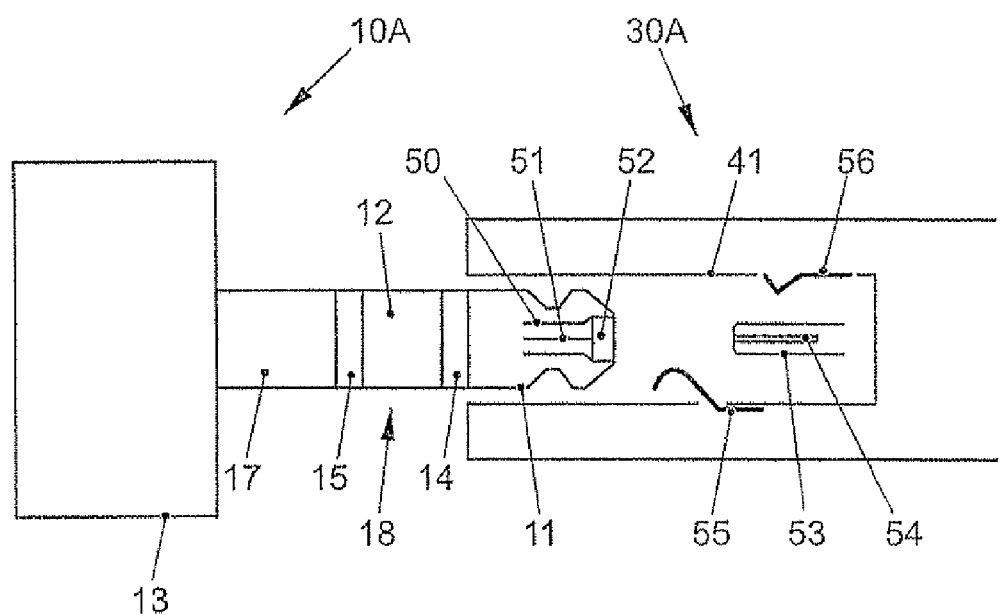
FIG. 5 is a cross-sectional view of two connector arrangements according to further embodiments of the present invention.

In FIG. 5, a male connector arrangement 10A according to another embodiment and a female connector arrangement 30A according to another embodiment are shown. Male connector arrangement 10A is based on a male audio connector similar to male connector arrangement 10 of the embodiment of FIGS. 1-3, and the same or similar parts bear the same reference numerals. In particular, also male connector arrangement 10A comprises a head 13 and an elongate member 18, the elongate member 18 having contact areas 11, 12 and 17 separated by electrically insulating rings 14, 15. Contact areas 11, 12 and 17 form a first connector of male connector arrangement 10A. These parts serve the same function as in the embodiment of FIGS. 1-3 and will therefore not be described again in detail. Inside elongate member 18, a second connector is provided comprising a conducting sleeve 50 and a conducting pin 51 arranged in an essentially coaxial manner. The second connector comprising conducting sleeve 50 and conducting tin 51 is accessible via an opening 52 at an end face of elongate member 18. The corresponding female connector arrangement 30A similar to female connector arrangement 30 of the embodiment of FIG. 4 comprises an elongate hole 41 having contacts 55, 56 arranged at a side surface thereof. In the connector arrangement 30A of the embodiment of FIG. 5, only two contacts 55, 56 for contacting portions 12 and 11, respectively, are provided on opposing sides as elongate hole 41. Sleeve portion 17 in the embodiment of FIG. 5 may be a ground connector directly contacting a conducting portion of elongate hole 41, thus establishing electrical contact. Contacts 55, 56 may be resilient contacts, and contact 56 may be designed to engage with a groove in tip portion 11 thus securing male connector arrangement 10A in female connector arrangement 30A. In another embodiment, contacts like contacts 31, 32 and 33 of FIG. 4 may be provided. Contacts 55 and 56 form a first connector of female connector arrangement 30A. A second connector of connector arrangement 30A comprises a cylindrical member 53 which has a conducting outer surface and a channel 54 for receiving a connecting pin and establishing electrical contact therewith. In other words, the second connector of female connector arrangement 30A is configured to match the second connector of male connector arrangement 10A.

The second connectors of connector arrangement 10A and 30A are coaxial connector with an inner contact formed by pin 51 and channel 54 and an outer contact formed by sleeve 50 and cylindrical member 53, respectively. The respective outer contacts may in an embodiments be used as a shielding. The second connectors of the embodiments of FIG. 5 may for example be used to transmit radio frequency (RF) signals. For example, male connector arrangement 10A may be coupled to a headset, the headset additionally comprising an antenna for example to receive radio transmissions. The antenna may be coupled with pin 51, and sleeve 50 may be coupled to a shielding of a corresponding wire coupling pin 51 with the antenna.

Similar to the embodiment of FIG. 4, the second connector comprising cylindrical member 53 and channel 54 may be retractable from elongate hole 41, for example using a spring mechanism as discussed with reference to FIG. 4, such that also standard audio connectors may be inserted into connector arrangement 30A. On the other hand, male connector arrangement 10A may be inserted in female audio connectors without using the second connector.

In the embodiments of FIGS. 1-5, the second connector of the male connector arrangement 10, 10A and the female connector arrangement 30, 30A are electrical connectors having one or more contacts. In another embodiment, the respective second connector may be an optical connector. An example for such an embodiment will now be discussed with reference to FIG. 6.

Figure 6:
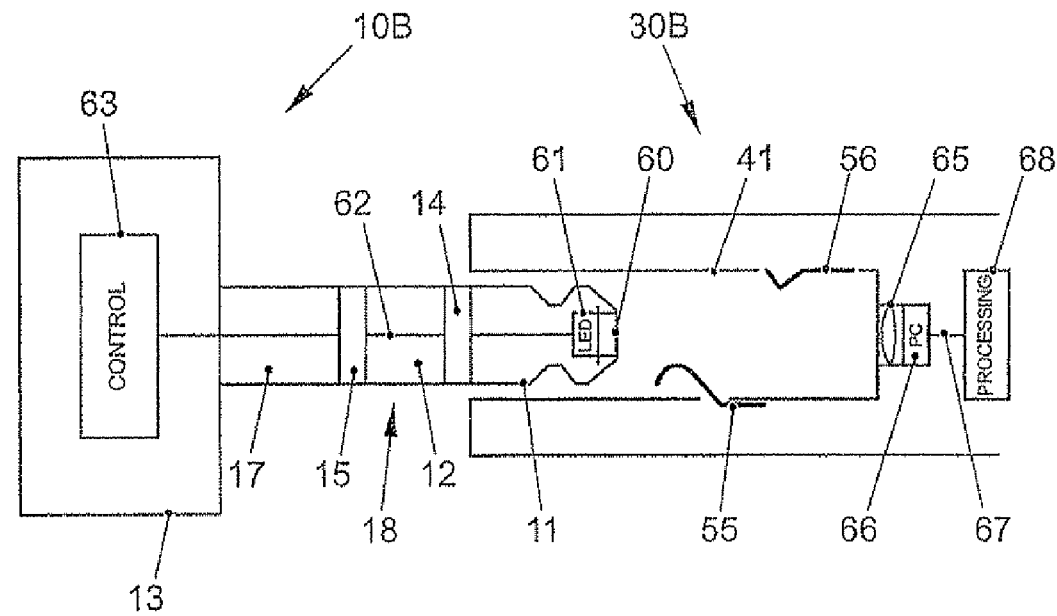
FIG. 6 is a cross-sectional view of two connector arrangements according to others embodiments of the present invention.

In FIG. 6, a male connector arrangement 10B according to a further embodiment and a female connector arrangement 30B according to a further embodiment are shown. The first connector and general shape of male connector arrangement 10B and female connector arrangement 30B correspond to those of male connector arrangement 10A and female connector arrangement 30A, and corresponding elements are marked with the same reference numerals. These portions which are similar in FIGS. 5 and 6 will not be described again.

In contrast to the embodiments of FIG. 5, in the embodiments of FIG. 6 optical connectors are used as the respective second connector of male connector arrangement 10B and female connector arrangement 30B. In male connector arrangement 30B, in tip portion 11 an optical transmitter 61, for example a light emitting diode (LED) is provided which is supplied via an electrical connection 62 by a control unit 63. Control unit 63 is configured to modulate the light emitted by light emitting diode 61 according to data to be transmitted. Light emitting diode 61 is protected by a transparent window 60 at an end face of tip portion 11.

In female connector arrangement 30B, at a bottom of elongate hole 41 a lens arrangement 65 for capturing light emitted by optical transmitter 61 is provided. Adjacent to lens arrangement 65, an optical receiver 66, for example a photo cell or a photo transistor is provided. Optical receiver 66 converts optical signals received for example for optical transmitter 61 to electrical signals and sends them via an electrical connection 67 to a processing unit 68 which for example demodulates the signals received to recover the data originally sent.

With the arrangement of optical transmitter 61 and window 60, male connector arrangement 10B may also be inserted into standard audio female connectors to establish an audio connection. On the other hand, standard audio connectors may be inserted into female connector arrangement 30B for establishing for example an audio connection via contacts 55, 56.

In the embodiment of FIG. 6, an optical transmitter is provided in male connector arrangement 10B, and an optical receiver 66 is provided in female connector arrangement 30B, thus enabling data transmission from male connector arrangement 10B and female connector arrangement 30B. In another embodiment, an optical transmitter may be provided in female connector arrangement 30B, and an optical receiver may be provided in male connector arrangement 10B to enable data transfer from female connector arrangement 30B to male connector arrangement 10B. In still another embodiment, these two possibilities may be combined enabling bidirectional data transfer.

The above embodiments are not to be construed as limiting the scope of the present invention, and numerous modifications and alterations are possible for persons skilled in the art. For example, as already mentioned, while as first connectors in the above embodiments standard audio connectors are shown, in the male connector arrangement 10, 10A, 10B generally an elongate member having a plurality of contact areas may be provided, and in the corresponding female connector arrangement an elongate hole for receiving the elongate member with contact elements arranged corresponding to the contact areas may be provided. In another embodiment, resilient contacts like contacts 31, 32, 33 or 55, 56 may be provided on an outside of an elongate member like elongate member 18 of a male connector arrangement, and corresponding contact areas may be provided in a female connector arrangement. The present invention is intended to be limited only by the appended claims and equivalents thereof.

What is claimed is:

1. A connector arrangement comprising:
an elongate member including at least two electrically conducting areas on an outer surface thereof, where the at least two electrically conducting areas are electrically insulated from each other to form a first connector comprising an audio connector; and
an elongate hole disposed in the elongate member, where at least one contact element is arranged, at an interior sidewall of the elongate hole, to form a second connector arranged within the elongate member and accessible from an end face of the elongate member, where the second connector is configured to form a connection independent of the first connector.

2. The connector arrangement of claim 1, where the audio connector comprises at least one of a 2.5 mm audio connector or a 3.5 mm audio connector.

3. The connector arrangement of claim 1, where the audio connector comprises at least one of a tip sleeve connector, a tip ring sleeve connector, or a tip ring sleeve connector.

4. The connector arrangement of claim 1, where the at least one contact element is configured as a contacting area in the sidewall.

5. The connector arrangement of claim 1, where the second connector includes a first contact element surrounded by a second contact element.

6. The connector arrangement of claim 5, where the first contact element includes at least one of a contact pin or a contact channel, and the second contact element includes at least one of a sleeve or a cylindrical member.

7. The connector arrangement of claim 1, where the second connector comprises an optical connector.

8. A connector device for use with an electronic apparatus, comprising:
an elongate hole disposed in the connector device and extending from an opening end to an interior of the connector device;
at least two contact elements arranged at an interior side surface of the elongate hole, the at least two contact elements forming a first connector comprising an audio connector; and
a second connector configured substantially coaxially with the elongate hole and to form a connection independently of the first connector.

9. The connector device of claim 8, further comprising:
a channel extending from an inner end of the elongate hole opposite the opening end and into the interior of the connector device, where the second connector comprises an elongate member configured to biasly protrude, from the channel, into the elongate hole from the inner end.

10. The connector device of claim 9, where the elongate member is substantially entirely retractable from the elongate hole into the channel.

11. The connector device of claim 9, further comprising:
a resilient member, disposed in the channel and coupled with the elongate member, to bias the elongate member to protrude into the elongate hole.

12. The connector device of claim 8, where the second connector includes a first contact element and a second contact element surrounding the first contact element.

13. The connector device of claim 8, where the second connector comprises an optical connector.

14. A connector device for use with an electronic apparatus, comprising:
an elongated receiving portion, disposed in the connector device and extending from an opening end to an interior of the connector device, to receive a another connector device of different electronic apparatus;
at least two resilient contact elements disposed at an interior side surface of the elongated receiving portion, the at least two resilient contact elements forming a first connector;
a channel extending away from the elongated receiving portion at an interior end, opposite the opening end, of the elongated receiving portion; and
an elongated member to displaceably protrude, from the channel, into the interior end of the elongated receiving portion forming a second connector to form, when the other connector device is configured to accommodate the elongated member, a connection with the other connector device independently of the first connector.

15. The connector device of claim 14, where the elongated member is substantially entirely retractable from the elongated receiving portion into the channel.

16. The connector device of claim 14, where, when the other connector arrangement is not configured to accommodate the elongated member, the elongated member is configured to be at least partially pushed into the channel.

17. The connector device of claim 14, further comprising:
a resilient member, disposed in the channel and coupled with the elongated member, to bias the elongated member to protrude into the elongated receiving portion.

18. The connector device of claim 17, where the resilient member is disposed substantially entirely within the channel.

* * * * *